US010216756B2

(12) United States Patent
Bollars et al.

(10) Patent No.: US 10,216,756 B2
(45) Date of Patent: Feb. 26, 2019

(54) METHOD FOR DISTRIBUTING DATA ASSOCIATED WITH OBJECTS IN DIGITAL MAP DATA (71) Applicant: TomTom International B.V., Amsterdam (NL)

(72) Inventors: Stefan Nico Anton Bollars, Helmond (NL); Brendan Joris Pete Rousseau, Eindhoven (NL); Rob Stefens, Nuenen (NL)

(73) Assignee: TOMTOM TRAFFIC B.V., Amsterdam (NL)

( * ) Notice: Subject to any disclaimer, the term of this patent is extended or adjusted under 35 U.S.C. 154(b) by 273 days.

(21) Appl. No.: 14/433,410

(22) PCT Filed: Oct. 4, 2013

(86) PCT No.: PCT/EP2013/070748
§ 371 (c)(1),
(2) Date: Apr. 3, 2015

(87) PCT Pub. No.: WO2014/053653
PCT Pub. Date: Apr. 10, 2014

(65) Prior Publication Data
US 2015/0254270 A1 Sep. 10, 2015

(30) Foreign Application Priority Data

Oct. 5, 2012 (GB) .................................. 1217897.6
Dec. 27, 2012 (GB) .................................. 1223401.9

(51) Int. Cl.
G06F 17/30 (2006.01)
H04W 4/04 (2009.01)
(Continued)

(52) U.S. Cl.
CPC ....... *G06F 17/30174* (2013.01); *G01C 21/32* (2013.01); *G01C 21/3682* (2013.01);
(Continued)

(58) Field of Classification Search
CPC ................................................... G01C 21/3682
(Continued)

(56) References Cited

U.S. PATENT DOCUMENTS 5,420,801 A * 5/1995 Dockter .................. G06F 8/458
345/501
6,226,317 B1 * 5/2001 Bruckert .................... G01S 5/14
370/335

(Continued)

FOREIGN PATENT DOCUMENTS

EP 2196772 A1 6/2010
EP 2408172 A2 1/2012

OTHER PUBLICATIONS

Search Report dated Jun. 13, 2013 for United Kingdom Patent Application No. 1223401.9.
(Continued)

*Primary Examiner* — Baoquoc N To (57) ABSTRACT

Embodiments of the present invention provide a method of distributing data from a server having memory storing static data and dynamic data associated with one or more objects within a plurality of tiles, each tile defining a geographic area in digital map data. The method comprising: selecting one or more tiles based on the location of a mobile device; synchronizing static data on the mobile device with the static data stored in the memory of the server for one or more objects within the selected one or more tiles; and distributing dynamic data updates to the mobile device associated with at least one object based upon the location of the mobile device.

14 Claims, 6 Drawing Sheets (51) Int. Cl.
  *G08G 1/0967* (2006.01)
  *G01C 21/32* (2006.01)
  *G01C 21/36* (2006.01)
(52) U.S. Cl.
  CPC ... *G01C 21/3697* (2013.01); *G06F 17/30241* (2013.01); *G08G 1/096716* (2013.01); *G08G 1/096741* (2013.01); *G08G 1/096775* (2013.01); *H04W 4/046* (2013.01)
(58) Field of Classification Search
  USPC .............. 707/640; 709/223, 414.3; 455/414.3
  See application file for complete search history.

(56) References Cited

U.S. PATENT DOCUMENTS

| | | | |
|---|---|---|---|
| 6,323,860 B1* | 11/2001 | Zhu | G06T 15/005 |
| | | | 345/427 |
| 6,724,382 B2 | 4/2004 | Kenyon | |
| 6,799,117 B1* | 9/2004 | Proett | E21B 49/08 |
| | | | 702/12 |
| 7,714,872 B2* | 5/2010 | Aoki | G06T 11/001 |
| | | | 345/427 |
| 7,957,748 B2 | 6/2011 | Heater et al. | |
| 8,521,424 B2 | 8/2013 | Schunder et al. | |
| 9,036,509 B1* | 5/2015 | Addepalli | H04W 4/046 |
| | | | 370/259 |
| 9,503,844 B1* | 11/2016 | Sprague | H04W 4/02 |
| 2006/0089793 A1 | 4/2006 | Rudow et al. | |
| 2007/0140185 A1* | 6/2007 | Garg | H04W 36/04 |
| | | | 370/338 |
| 2008/0109162 A1* | 5/2008 | Chen | G01C 21/3415 |
| | | | 701/414 |
| 2009/0104919 A1 | 4/2009 | Heater et al. | |
| 2011/0072368 A1 | 3/2011 | MacFarlane et al. | |
| 2011/0166777 A1 | 7/2011 | Chavakula | |
| 2012/0078512 A1 | 3/2012 | Schunder et al. | |
| 2013/0332058 A1* | 12/2013 | Prestor | G08G 1/0962 |
| | | | 701/118 |
| 2014/0013271 A1* | 1/2014 | Moore | G06F 3/0482 |
| | | | 715/792 |
| 2015/0264554 A1* | 9/2015 | Addepalli | H04W 4/046 |
| | | | 370/328 |

OTHER PUBLICATIONS

International Search Report dated Apr. 4, 2014 for International Application No. PCT/EP2013/070748.

\* cited by examiner

METHOD FOR DISTRIBUTING DATA ASSOCIATED WITH OBJECTS IN DIGITAL MAP DATA

CROSS-REFERENCES TO RELATED APPLICATIONS

This application is the National Stage of International Application No. PCT/EP2013/070748, filed Oct. 4, 2013, and designating the United States. The application claims priority from United Kingdom Patent Application No. 1217897.6 filed Oct. 5, 2012 and United Kingdom Patent Application No. 1223401.9 filed Dec. 27, 2012. The entire content of these applications is incorporated herein by reference.

FIELD OF THE INVENTION

Embodiments of the invention relate to methods, apparatus and a data structure for communicating information associated with locations in digital map data.

BACKGROUND TO THE INVENTION

As connected mobile navigation devices become more prevalent, i.e. those devices having means to connect to a remote server over a wireless network, there is a need to communicate information related to locations on a digital map (stored on the device) that is not part of the locally-stored map or is dynamical in nature (i.e. has a different dynamic than the map data).

It is currently known to associate one or more attributes with an object in digital map data. The object represents a real-world entity, such as speed camera, having properties modelled by the one or more attributes. A speed (or safety) camera represented at a location of the object in the digital map data may, for example, be associated with a direction attribute indicating the direction in which the camera faces or a speed limit attribute indicating a speed limit which the camera is provided to enforce. When a property of the camera changes, such as the direction which the camera is facing, this may be communicated to devices using the digital map data. Dissemination of the changed property may be achieved by pushing the data from a server to the device or to the devices. Such pushing may be performed on a periodic basis, i.e. daily, twice weekly, etc, or whenever a property changes at the server.

It is an object of embodiments of the invention to provide an improved method of disseminating information associated with such objects from a server to one or more mobile devices.

SUMMARY OF THE INVENTION

In accordance with a first aspect of the present invention, there is provided a method of distributing data from a server, said server having memory storing static data and dynamic data associated with one or more objects within a plurality of tiles, each tile defining a geographic area in digital map data, the method comprising:

selecting one or more tiles based on the location of a mobile device;

synchronising static data on the mobile device with the static data stored in the memory of the server for one or more objects within the selected one or more tiles; and distributing dynamic data updates to the mobile device associated with at least one object based upon the location of the mobile device.

The one or more selected tiles may comprise at least one of: the tile including the location of the mobile device; and one or more tiles adjoining the tile including the location of the mobile device.

The synchronising may comprise determining a validity of static data on the mobile device associated with the objects within the tile, and updating invalid static data on the mobile device. The validity of the static data may be determined based upon validity information of the static data and a current time. The validity information of the static data may be at least 3 minutes.

The method may comprise determining one or more channels for which the mobile device is registered, and wherein only the static data associated with the registered channels is synchronised.

The method may comprise determining one or more channels for which the mobile device is registered, and wherein only the dynamic data updates associated with the registered channels is distributed.

The method may comprise the step of the mobile device requesting from the server current dynamic data for one or more objects.

The dynamic data updates communicated to the mobile device may be associated with one or more objects within a predetermined distance of the location of the mobile device. Alternatively, the dynamic data updates communicated to the mobile device may be associated with one or more objects within the tile encompassing the current location of the mobile device The method may comprise communicating dynamic data to the mobile device based on validity information of the dynamic data. The validity information may indicate a time-to-refresh (TTR) of the dynamic data and the dynamic data is communicated to the mobile device in accordance with the TTR. The TTR may be less than one second. The validity information may be indicative of an expiry time of the dynamic data.

It will be appreciated that the methods in accordance with the present invention may be implemented at least partially using software. It will this be seen that, when viewed from further aspects, the present invention extends to a computer program product comprising computer readable instructions adapted to carry out any or all of the method described herein when executed on suitable data processing means. The invention also extends to a computer software carrier comprising such software. Such a software carrier could be a physical (or non-transitory) storage medium or could be a signal such as an electronic signal over wires, an optical signal or a radio signal such as to a satellite or the like.

In accordance with another aspect of the invention, there is provided a server, comprising:

at least one memory device for storing static data and dynamic data associated with one or more objects within a plurality of tiles, each tile defining a geographic area in digital map data;

a communications device arranged to communicate with a plurality of mobile devices;

a processor for executing one or more software modules; and a location based dynamic object (LBDO) module arranged to:

select one or more tiles based on the location of a mobile device;

synchronise static data on the mobile device with the static data stored in the at least one memory device for one or more objects within the selected one or more tiles; and distributing dynamic data updates associated with at least one object based upon the location of the mobile device.

In accordance with another aspect of the invention, there is provided a mobile device, comprising:

at least one memory device for storing static data and dynamic data associated with one or more objects within a plurality of tiles, each tile defining a geographic area in digital map data;

a communications device arranged to communicate with a remote server;

a processor for executing one or more software modules; and a location based dynamic object (LBDO) module arranged to:

synchronise static data stored in the at least one memory device with static data on the remote server based on a location of the mobile device, wherein the static data is associated with one or more objects within at least one tile; and receive dynamic data updates associated with at least one object based upon the location of the mobile device.

The present invention in either of these aspects may include any or all of the features described in relation to the first aspect of the invention, and vice versa, to the extent that they are not mutually inconsistent. Thus, if not explicitly stated herein, a server and/or mobile device in accordance with the present invention may comprise means for carrying out any of the steps of the method described.

The means for carrying out any of the steps of the method may comprise a set of one or more processors configured, e.g. programmed, for doing so. A given step may be carried out using the same or a different set of processors to any other step. Any given step may be carried out using a combination of sets of processors.

In accordance with another aspect of the invention, there is provided a location based dynamic object (LBDO) data structure, comprising:

data indicative of a geographic location;

a static data portion having data indicative of one or more slowly-varying attributes associated with the geographic location and validity information indicative of a valid period for the static data; and a dynamic data portion having data indicative of one or more dynamically variable attributes associated with the geographic location and validity information indicative of a valid period for the dynamic data.

The validity information of the static data may be indicative of a valid period of at least 3 minutes.

The validity information of the dynamic data may be indicative of a valid period of less than 1 second. Alternatively, the validity information of the dynamic data may indicate a time-to-refresh (TTR) period of the dynamic data.

The data structure may comprise a channel-identifier for identifying a channel associated with the LBDO, wherein the channel is indicative of a type of attribute stored in the static data and/or the dynamic data.

The static data may be associated with a tile defining a geographic area in digital map data.

The data structure may be stored on a non-transitory computer-readable medium.

The present invention in accordance with any of its further aspects or embodiments may include any of the features described in reference to other aspects or embodiments of the invention to the extent it is not mutually inconsistent therewith.

Advantages of these embodiments are set out hereafter, and further details and features of each of these embodiments are defined in the accompanying dependent claims and elsewhere in the following detailed description.

BRIEF DESCRIPTION OF THE FIGURES

Embodiments of the invention will now be described by way of example only, with reference to the accompanying figures, in which.

DETAILED DESCRIPTION OF PREFERRED EMBODIMENTS

The invention, at least in preferred embodiments, provides an abstraction layer which enables a plurality of different content services to communicate information with regard to objects located on a map and their current state without the need for content-specific software and systems. Embodiments of the invention provide for control over the communication of the state of objects, as will be appreciated.

Embodiments of the present invention provide a data structure for communicating dynamic data to mobile devices, wherein the data structure comprises data relating to one or more dynamic attributes of an object and validity information indicative of a time to refresh the data, such as less than one second. Embodiments of the present invention further provide a data structure for communicating static data to mobile devices, wherein the data structure comprises data relating to one or more static attributes of the object and validity information indicative of a validity period of the static data, wherein the validity information indicates a validity period of one minute or longer. The aforementioned data structures may form respective parts of a combined data structure related to an object in digital map data as will be explained.

Embodiments of the present invention will be described with reference to communicating location-based dynamic objects (LBDOs) to a navigation device. However it will be realised that the usefulness of embodiments of the present invention extends beyond navigation devices to any type of device which may usefully be provided with information relating to a dynamically changing location based object. For clarity, references below to a "device" will be assumed to refer to a navigation device although it will be realised that this is not intended to be limiting.

Some real-world entities or geographic locations have one or more attributes which may change over time. A speed limit enforcement device, such as a speed (or safety) camera, may have one or more associated variables indicating, for example, a facing direction of the camera, speed limit, etc. It can be appreciated that some attributes of such entities vary relatively slowly, such as in the order of minutes, whereas others may vary much more rapidly, such as in the order or seconds. Attributes which vary relatively slowly over time may be referred to as "static" attributes or data, although it will be realised that that the term "static" does not imply that the attribute's value is fixed or permanent. In the sense of the present invention the term "static" also encompasses slowly-varying data as well data which is fixed. Thus, the term "static" is used herein relative to the term "dynamic", such that static data varies at a slower, typically substantially slower, rate than the dynamic data.

In another example, traffic control signals, such as traffic lights or stop lights, may be used to control a flow of traffic at a road junction or intersection. An attribute of the traffic control signal is a current colour of the traffic control signal, which varies on a substantially continuous basis, i.e. between a plurality of possible colours such as red, amber and green. In this case, the state of the traffic control signal varies on a relatively frequent basis, i.e. the status of the traffic control signal should be monitored at least once a second, preferable more frequently, in order to have accurate status information regarding the light's colour. Thus a "dynamic" attribute or data associated with the traffic control signal is colour, cycle length (e.g. a period between a stop phase and the next stop phase), transition time or the like. In addition, the traffic control signal also has static attributes which change less frequently, such as information about the road network with which the traffic control signal is associated.

In embodiments of the present invention the LBDO comprises location information identifying a geographic location of an entity with which the object is associated. The geographic location may be a point location or may define a geographic area. Furthermore, the LBDO comprises validity information associated with data which defines one or more attributes of the entity. The validity information identifies a period of time for which the data is valid, as will be explained. In embodiments of the invention LBDOs comprising static data are distributed to devices in a synchronisation process, which may be based on a location of the device, and in relation to one or more geographic areas known as tiles, and the validity information associated with the data. In embodiments of the invention LBDOs comprising dynamic data are provided to devices to enable frequent updating of the dynamic data on the device.

The LBDO Object

Figure 1:
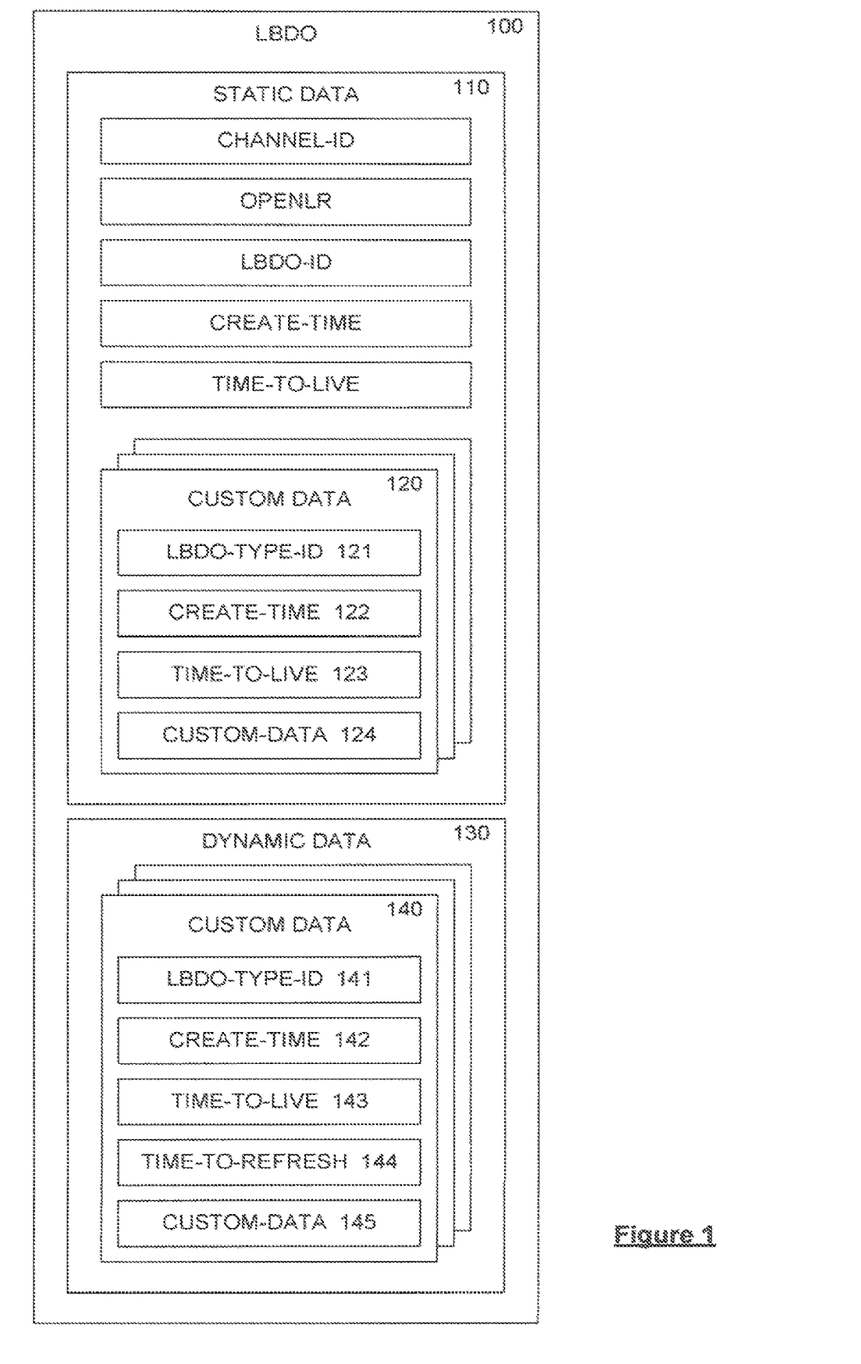
FIG. 1 shows a structure of a location-based dynamic object (LBDO) according to an embodiment of the invention.

An exemplary data format of an LBDO object 100 is shown in FIG. 1.

The LBDO object 100 as shown in FIG. 1 comprises static data 110 and dynamic data 130 portions. As will be appreciated from the description below, the static 110 and dynamic 130 may be stored and communicated separately. That is some LBDOs may comprise only one of the static data 110 or dynamic data 130 which may be individually communicated to devices. However the LBDO may be stored, either in a server or in the device for example, comprising both the static and dynamic data 110, 130.

Static Data

The static data 110 is provided to store data which changes relatively slowly, i.e. less frequently than the dynamic data 130. The static data 110 may not be truly static, i.e. invariant, but may instead vary relatively slowly. The static data 110 is provided to represent attributes of an entity having a relatively low frequency of updating, such as topology information relating to an area around a traffic light, which is expected to change very infrequently, or weather information which, whilst continually changing, does not change so quickly as to warrant dynamic, i.e. substantially real-time, updating. The static data may be data which varies in a time scale of minutes, such as a few minutes, or longer.

The static data 110 of the LBDO object 100 is preferably continuously synchronised to devices in the same area as the object. By continuously synchronised it is understood that validity information is used to determine whether it is necessary to update the static data 110 of the LBDO on the device. The life cycle associated with the static data for the synchronisation mechanism can range from minutes to years, although is preferably at least 3 minutes.

The static data 110 may also be periodically synchronised to devices, such as in expectation of the device requiring the static data 110, as will be explained below.

The LBDO 100 is identified by its location on the digital map, e.g. with reference to a geographic coordinate system, such as longitude and latitude, or more preferably as defined by a dynamic location referencing system such as OpenLR (www.openlr.orq). The location can be a point, a line or an area, such as a rectangle or a square. Each object has static data 110 and dynamic data 130; each type of data has an associated lifecycle with the static data being longer than the dynamic data. The static 110 and dynamic 130 data of the object 100, as discussed in more detail below, is treated differently by the system, e.g. in the manner by which the data is updated and communicated between the server and the local devices.

The location of the object 100 is stored in a location field 112 of the static data 110. The location field 112 identifies the geographic location of the object or entity in the real world. Some embodiments use a location reference system based on geographic coordinates, such as WGS84, to identify the location of the object. However if the digital map data used by the sender and receiver devices differs then an error may be encountered. Therefore the use of a dynamic location referencing system, such as OpenLR, may be preferred due to its map agnostic nature.

The static data 110 comprises an identification field 113 which is used to store a unique identifier (ID) for the LBDO. The LBDO-ID 113 may be assigned in a predetermined manner, i.e. sequentially to LBDOs, or in another manner, such as a pseudo-random manner.

The static data 110 further comprises validity information in the form of creation time information 114 and expiry information 115. The creation time information 114 provides a timestamp indicating a creation time or time at which the static data 110 was determined to first be valid. The creation time information 114 may be stored in a predetermined format to identify the time of creation or validity of the static data 110. The expiry information 115 is shown in FIG. 1 as a time-to-live (TTL) entry which provides a timestamp identifying a time at which the validity of the static data 110 expires. The expiry information 115 may be absolute, i.e. identifies the expiry time of the static data 110 alone, or may be relative to identify the expiry time based upon the creation time information 114 such as defining a time period calculated from the creation time 114.

The static data 110 comprises one or more custom data records 120. The one or more custom records represent the payload of the static data 110 (and similarly the payload of the dynamic data 130 in the case of the one or more custom data records 140 of the dynamic data 130). FIG. 1 indicates the static data 110 comprising a plurality of custom data records 120, although it will be realised that this is merely exemplary and the static data may comprise one or more custom data records.

Each custom data record 120 comprises an LBDO-type-ID 121, and validity information in the form of creation time information 122 and expiry time information 123 (in the exemplary embodiment in the form of time-to-live (TTL) information 123). The creation time information 122 and expiry time information 123 for the custom data 120, as previously described for the static data 114, 115 allows independent creation and expiry time to be defined for each of the custom data records 120 separately from the static data 110 portion. For example, a custom data record 120 may expire before the static data 110, and different custom data records 120 may have different expiry times. However in some embodiments the creation time information 122 and expiry information 123 of one or more of the custom data records 120 may be unused and reference may be made to the static data 110 creation time and expiry information 114, 115.

The static data 110, and also the dynamic data 130 in some embodiments, share a type information 121, 141 data field data "LBDO-type-ID". The type information 121, 141 stores an identifier which may be used to determine the type of information provided by the static data 110 and the dynamic data 130. The identifier may be a data value which may be used to look up the type of data provided, such as to enable filtering or searching of the custom data 120, e.g. to locate data of interest.

It is contemplated that multiple object types can be defined within a single problem space (or "channel") to cover multiple aspects of the use case. In other words, in a charging station use case described in more detail below, different object 100 types may be defined for different charging stations, such as those that offer a quick charge and those that offer a long charge, since the life cycle, e.g. availability of the two types of station, associated with the data may differ. The type information may be used, for example, by a receiving device to request data corresponding to a particular type of charging station or to filter received information stored on the device.

Each object type can have its own characteristics with regard to life cycle management, payload, etc.

As shown in FIG. 1, an object type is preferably the same for the static part 110 and the dynamic part 120 of an object 100.

Each custom data record 120 stores custom data 124, 145 indicative of one or more properties of the LBDO 100. As noted above, the static part 110 of the LBDO 100 provides information which is expected to have a relatively low frequency of change. The custom data 124 stores data such as a description of a crossing topology associated with a traffic light or weather information, e.g. precipitation, such as rain, snow and the like. The custom data 124 of the static data 110 may be used to store a wide variety of low-update-frequency information and these are merely illustrative examples.

Dynamic Data

The dynamic data 130 of an LBDO object 100 is preferably only communicated if the device indicates that this is necessary. The target for communicating dynamic data is preferably to enable a cycle time below a second, thereby making it possible to communicate extremely time sensitive information, such as is required by "green wave" systems (as discussed below).

There are a number of possible scenarios for the communication of dynamic data; these include one or more of:

The client can subscribe to a "touch" event, where the current location of the device overlaps with a LBDO object. As soon as the object is touched the client layer will automatically start retrieving dynamic data while adhering to its associated life cycle. This technique can be referred to as "hot objects". An exemplary illustration of a hot object will be provided below.

The client can decide that it needs the state of all LBDO objects in a particular area, e.g. around the current location of the device. The query will trigger the client layer to obtain the current states of all objects found in a single request. This technique is referred to as "object queries".

An exemplary embodiment of the dynamic data 130 is shown in FIG. 1 wherein the dynamic data 130 comprises one or more custom data records 140. Each custom data record 140 comprises type information 141, and validity information in the form of creation time information 142 and expiry information 143, as previously described for the static part 110.

The dynamic data 130 further comprises a time-to-refresh (TTR) field 144 of the custom data 140 which stores a value indicative of a refresh period for the dynamic data 130. The TTR field 144 stores a data value, which as noted above is preferably although not exclusively, less than a second indicating the time at which the dynamic data should be refreshed. For example, when the custom data relates to a state of a traffic light the time-to-refresh may be 250 ms.

Similar to the static data 110, each dynamic custom data record 140 stores custom data 145 which provides an attribute of the LBDO 100 which is expected to be frequently updated, such as traffic light state information or charging station availability information, although these are merely examples.

Dividing a Geographic Region into Channels and Tiles

It has been recognised that the area around a device for which updated data is required will often vary based on the use case. For example, a large number of objects 100 are required to describe all the traffic lights in a city (i.e. high density), whereas only a single object is needed to describe the weather over a correspondingly large area of the map (i.e. low density). Accordingly, the system preferably utilises at least one of, and preferably both of, the following two approaches.

Channels

A channel is targeted at a specific problem area, e.g. green wave, weather or the like, and will only contain objects for that problem space. This makes it possible to define a different granularity for each channel when synchronising object information to the client device.

As shown in FIG. 1, the static part 110 of the LBDO 100 comprises a channel-ID field 111 used to store a unique channel identifier. The channel-ID 111 may be used by the device to subscribe to particular information, such as weather, charging station availability, traffic light information and the like. It will be realised that this list is not exhaustive. The channel-ID 111 is used to enable to device to only receive relevant information.

Tiles

By dividing a geographic region covered by a map into tiles, the device and the "back office" server(s) of the system are able to share the same view of the geographic region. The LBDOs 100 are each linked or associated with one of the tiles, based on the location of each object, as defined by the location field 112. In some cases an object can be associated with more than one tile such as when the object spans a plurality of tiles. A device is therefore able to synchronise the data associated only with the objects in a tile, rather than all of the objects in the map.

Tiles can be of any desired shape and/or size. For example, tiles can range from squares or rectangles of a couple of square kilometers to hundreds of square kilometers. Typically, the size of the tiles is selected based on the density of LBDO objects in the geographic region covered by the tiles.

The tile sizes can be configurable at a channel level to give each channel an optimum tile size for the amount of LBDOs and their expected usage. Different tile sizes can be used, even for the same object type, when tiling a geographic region. The system can inform the device of tile sizes during synchronisation of the static information.

Figure 4:
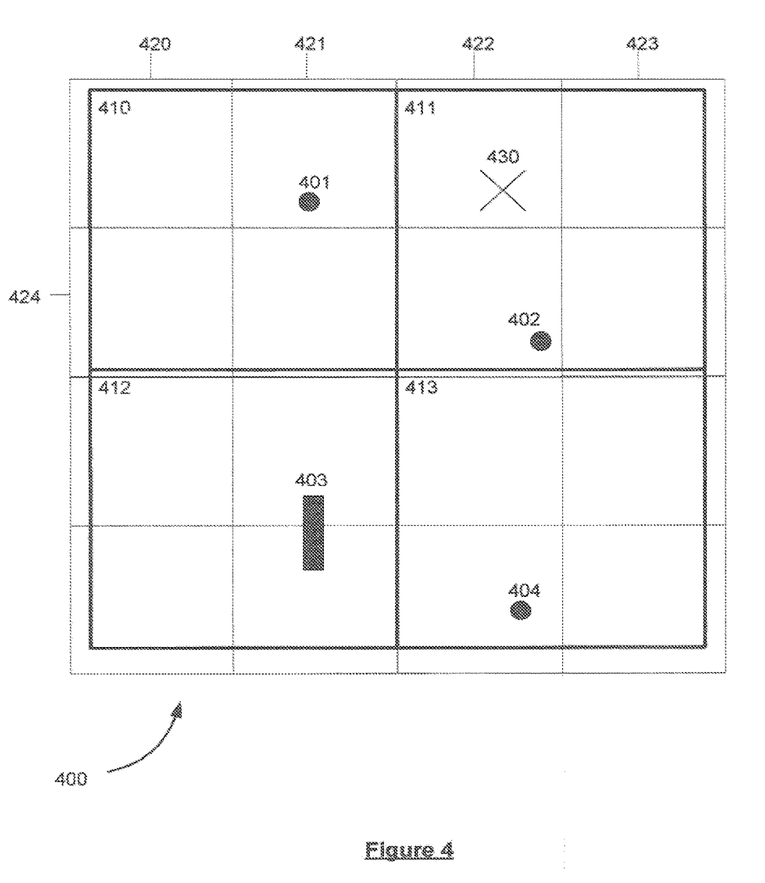
FIG. 4 shows an illustration of a geographic area and tiles according to an embodiment of the invention.

FIG. 4 illustrates an exemplary use of channels and tiles. FIG. 4 represents a geographic region 400 including four locations 401-404 associated with LBDOs 100. The region 400 is covered by two channels, although it will be realised that this is not limiting.

A first channel relates to relatively low density object information, such as the weather. The region 400, such as the portion of a map, is divided into a first plurality of tiles 410-413 corresponding to a first channel having an associated channel-ID.

The region 400 is further divided into a second plurality of tiles 420-424 (only some of which are given reference numerals for clarity) corresponding to a second channel having an associated channel-ID different from that of the first channel. The second channel relates to relatively high density objects and thus the size of each of the second plurality of tiles 420-424 is smaller than that of each of the first plurality of tiles 410-413. Although in the exemplary layout of tiles in FIG. 4 the first and second pluralities of tiles are not partly co-terminus, i.e. the tiles are offset, it is also envisaged that the pluralities of tiles may be partly co-terminus.

It will be noted that, for example, location 401 corresponds to tile 421 within the second plurality whilst also corresponding to tile 410 from the first plurality. Thus, a location may reside within more than one tile. Although the first and second plurality of tiles have been described as relating to corresponding first and second channels it will be realised that tiles may be used for more than one channel. For example, the first plurality of tiles may be used for a plurality of channels. It will also be noted that location 403 spans two tiles.

In embodiments of the invention, the static data 110 of LBDOs is communicated to devices based on the tile(s) within which the object is located. In use a device located at position 430 may request the static data 110 of LBDOs corresponding to objects within tile 411 for the first channel and tile 422 for the second channel. In this way the device is provided with the static data 110 of LBDOs in quantities relevant to the density of objects in the region 400 which conserves communication bandwidth. It will be realised that the validity information 114, 115, 122, 123 of the static data 110 is used to prevent unnecessary communication of static data which is already present on the device and which is still valid.

The device may request static data associated with tiles which the device is not currently located within. For example, the device may request static data 110 associated with one or more tiles which the device expects to enter, such as tile 421 in FIG. 4. The device may also request static data for one or more tiles adjoining a tile in which the device is currently located.

Burst Communication for "Popular" Tiles

In a preferred embodiment, the device can maintain statistics on the tiles that are touched on a regular basis because of the travel patterns of a user. This allows the device, for example, whenever it is in the vicinity of a communications network, such as WiFi, to synchronize tiles in advance instead of waiting until the need arises based on the gathered usage statistics.

Sending LBDO Information to Devices

Figure 2:
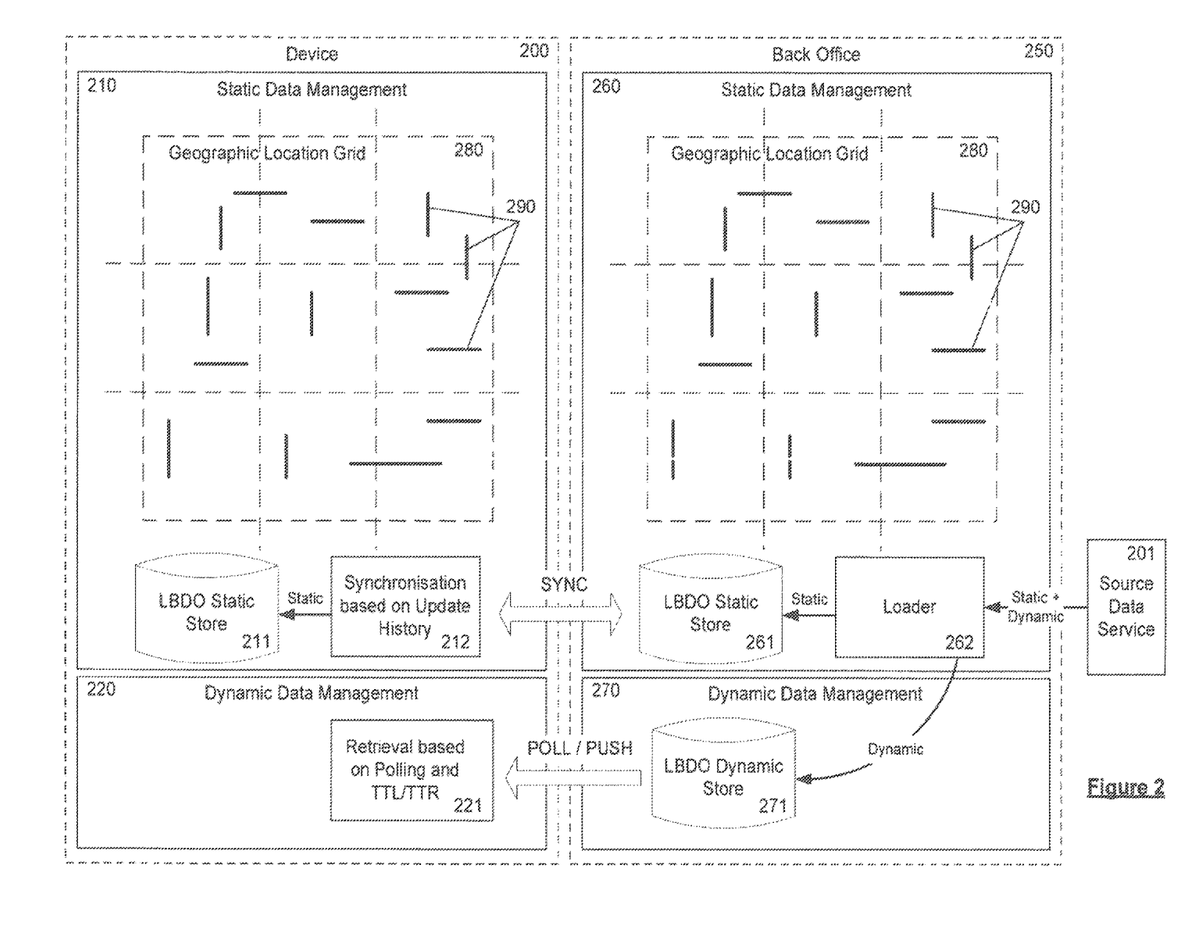
FIG. 2 shows a structure of a LBDO system according to an embodiment of the invention.
Figure 3:
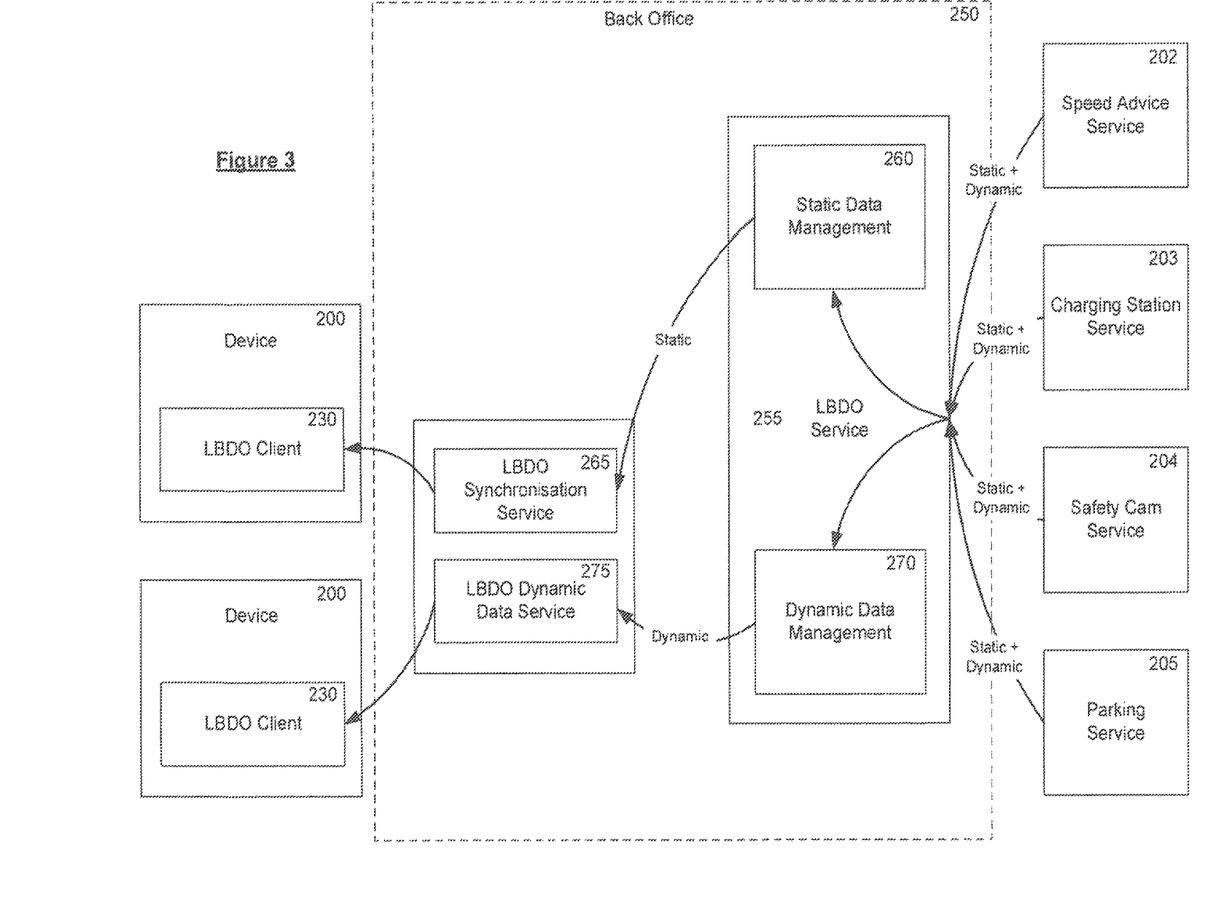
FIG. 3 shows a further illustration of the structure of the LBDO system according to an embodiment of the invention.

An exemplary architecture of the LBDO system according to an embodiment of the invention is shown in FIGS. 2 and 3.

Each use case needs to reserve a channel number for its object space and to create a service which will provide the dynamic 130 and static 110 data to the LBDO system. The system preferably exposes an LBDO loader 262 interface which processes the objects and updates static and dynamic data stores 261, 271. As information is preferably divided into tiles and channels various options exist for scaling the system (e.g. assigning specific tiles/channels to computational nodes or servers).

Devices 200 will be moving across the tile grid and provide their position to the LBDO client layer 230 at regular intervals depending on the use case (e.g. for green wave it would be every second but for weather it could be measured in minutes). The client layer 212, 230 will use the position combined with tile update timestamps to determine whether new information is required. This is achieved by sending a request to the server 250 for every tile the device is on and any surrounding tiles, e.g. whenever the device moves to another tile or wakes up in a tile. This request preferably carries the timestamps of the tiles so the server 250 can check whether updates are required. If so, static data 110 will be conveyed to the client 212 and stored locally 211. This is shown in FIG. 2.

The exemplary system architecture, as shown in FIG. 3, preferably allows the following options for scalability:

Multiple LBDO gateways: The gateway 250 is the connection end point for the devices 200, 210. As each call is stateless it is possible to use round robin approaches with n servers for the gateways. Using DNS techniques it is possible to prevent a single communication channel from becoming a bottle neck by introducing multiple communication channels/locations spread over the communication infrastructure.

Loader architecture: The loader 262 can distribute incoming object updates over a large number of distributable workers which are responsible for updating the dynamic and static stores.

Store architecture: Due to the division of a geographic region into channels and tiles the stores 261, 271 can contain information with regard to a single channel/tile as the lowest common denominator.

FIGS. 2 and 3 illustrate an exemplary system according to an embodiment of the invention which comprises navigation devices 200 and a server 250. The devices 200 are communicably coupled by a communication channel formed over, for example, a wireless data link such as provided by a telecommunications network, to the server or gateway 250.

The device 200 comprises a static data management module 210 and a dynamic data management module 220. The modules may form part of an LBDO client 230 on the device 200. The static data management module 210 further comprises a static data store 211 for storing the static part 110 of LBDOs and a static synchronisation component 212 for synchronising the static data 110 with the server 250, as will be explained. The dynamic data management module 220 further comprises a dynamic data retrieval module 221 for retrieving/receiving the dynamic part 130 of LBDOs from the server 250. It will be noted that the dynamic module 220 is not shown as specifically comprising a store for the dynamic data. Since the dynamic data is updated or changed relatively frequently it is not expected necessary or desired to store the dynamic data for a long period of time in a specific store. However it will be realised that the dynamic data 130 will be stored at least temporarily in a memory of the device 200 for use thereby.

The server 250 comprises a static data management module 260 and a dynamic data management module 270. As with the device 200, the server 250 also comprises a static data store 261. However it will be expected that the static data store of the server 250 comprises considerably more static data than the device 200, 210 since the server 250 may store static data 110 for a larger number of tiles and/or channels than the device 200, which only stores relevant static data, i.e. corresponding to one or more tiles within which the device 200 is located, or expects to be located.

Both the device 200 and the server 250 have access to digital map data representing a geographic region. As described above, the region is divided into at least a first plurality of tiles 280 of which both the device 200 and server 250 are aware from tile information. The region further comprises a plurality of LBDOs 290 (only some of which are numbered). One or more source data services 201-205 provide data for the LBDOs 100. The source data service 201-205 may be, for example, a traffic management system controlling traffic lights, a weather information service, a vehicle charging information service, a safety/speed camera information service, etc. Each service provides relevant information to the server 250 for distribution to devices 200.

The information provided by the services 201-205 is received by the loader 262 via a suitable interface. The loader determines whether the information is static or dynamic in nature, depending upon the expected speed of updating and stores static data 110 in the static data store 261 and dynamic data in the dynamic data store 271. From the stores 261, 271 the static data management module 260 and the dynamic data management module 270 distribute the data 110, 130 to devices as will be explained.

Figure 5:
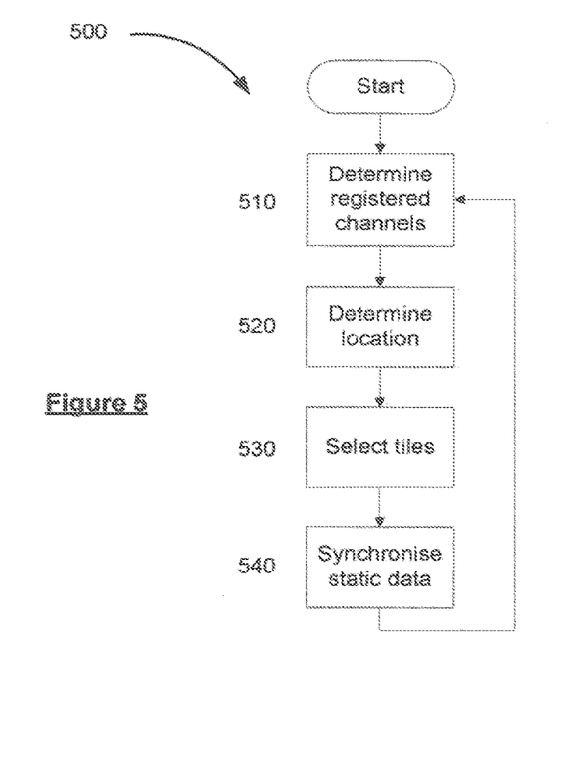
FIG. 5 illustrates a method according to an embodiment of the invention.

FIG. 5 illustrates a method 500 according to an embodiment of the invention. The method is a method 500 of distributing static data 110 of LBDOs to devices 200. The method may be partly performed by the static data management module 210 of the device 200 and the static data management module of the server 250.

In step 510 the module 210 determines to which channels the device 200 is registered. Step 510 may comprise retrieving a user profile associated with a user of the device 200 or a settings profile of the device 200 to determine which channels the user has registered. For example, the user may have registered for a channel relating to charging point information and/or a channel providing weather information.

In step 520 the module 210 determines the location of the device. The location of the device 200 may be determined from wirelessly received signals, such as GPS signals, at least in part. Location information may be provided from a location determining module of the navigation device not shown in FIG. 2.

In step 530, based on the location determined in step 520, the module 210 determines one or more tiles to which the location corresponds. The tile may be a tile in which the device is currently located, or one or more tiles in which the device 200, 210 expects to travel. The tiles are determined with reference to the tile information. In order to determine the corresponding tile(s), reference may be made to the channels determined in step 510 since, as explained above, tiles may be differently sized or located depending for different channels. In some embodiments, the module 210 may request static data 110 for, not only the tiles within which the device is currently located, but also for tiles adjacent the current tile and/or for tiles which the module 210 anticipates the device 200 may enter such as based upon a travel history of the device 200 and/or a proximity of the device to an edge of the current tile.

In step 540 static data is synchronised for the determined channels and tiles. Step 540 may comprise the module 210, in particular the synchronisation component 212, requesting the server 250 to provide static data 110 corresponding to the requested tile(s) and channel(s). The request may comprise timestamps relating to when the static data 110 associated with the tiles was last updated such that the server 250 can determine whether the static data 110 is required to be updated. For example, all of the static data 100 may still be valid, i.e. an expiry time defined by the expiry information 115, 123 may not have arrived and thus the static data 110 does not require updating. In other embodiments the component 212 may determine whether it is necessary to request static data 110 based on the expiry information 115, 123. Received static data is stored in the static data store 211 of the client device 200 for use by one or more processes executing thereon, such as a speed camera alert process or a traffic light information process.

Figure 6:
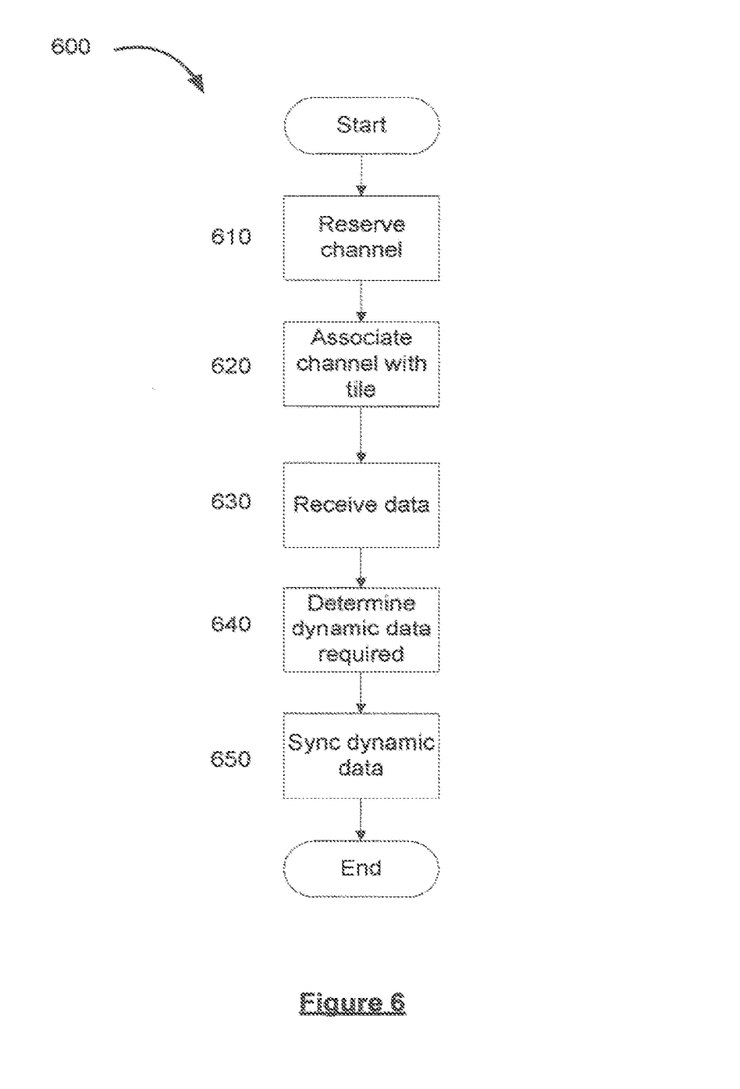
FIG. 6 illustrates a method according to another embodiment of the invention.

FIG. 6 illustrates a method 600 according to another embodiment of the invention. The method is a method 500 of distributing dynamic data 130 of LBDOs to devices 200. The method 600 may be partly performed by the dynamic data management module 220 of the device 200 and the dynamic data management module 270 of the server 250.

The method 600 comprises a step 610 of reserving a channel. As noted above, a channel is associated with a particular problem space to provide information relevant to that problem space. For example, the problem space may be associated with finding a charging station for an electric vehicle. As part of step 610 a channel-ID 111 may be allocated to identify the channel which is communicated in LBDOs for that channel. The channel-ID 111 is used to provide only relevant or desired information to devices subscribed to the particular channel. Step 610 may be performed prior to dynamic data being distributed to devices 200.

In step 620 the channel may be associated with one or more tiles. As discussed above, a tile identifies a geographic area. The size of the geographic area may be dependent upon the problem space. For example, in the case of weather information the tile may identify a relatively large geographic area, whereas in the case of the charging station example, the tiles may be relatively smaller, such as 2 km×2 km, since it is expected that the user wishes to find a relatively local charging station. As described previously with reference to FIG. 5 the association with tiles is used to distribute static data 110 to devices 200. Thus alongside the method of FIG. 6 the method of FIG. 5 may be performed to distribute the static data 110.

Step 630 comprises receiving data from a data source 201-205. The data may comprise static and dynamic data.

The data source 201-205 may be a provider of information associated with a particular type of entity, such as a speed advice service, a charging station service, a safety or speed camera service or a parking service, although the present invention is not limited in this respect. The data may be received by the loader 262 of the server 250 and respective data stored in the static data store 261 and dynamic data store 271 of the server 250.

In step 640 dynamic data required by the device 200 is determined. As noted above, dynamic data is only provided to the device 200 if required based upon the device's location and the validity information of the dynamic data 130. During step 340 the device client 230, specifically the dynamic data management module 220, determines the device's current location, such as by requesting the location from a component of the device 200. As noted above, dynamic data may either be requested for hot objects or object queries. For an object query the module 220 may determine which tile the device is currently located within. The module 220 may then request the dynamic data module 270 of the sever to provide dynamic data 130 for relevant channels corresponding to objects within the tile. In this way the device is able to query the server 250 for dynamic data for objects in a region around the device.

Figure 7:
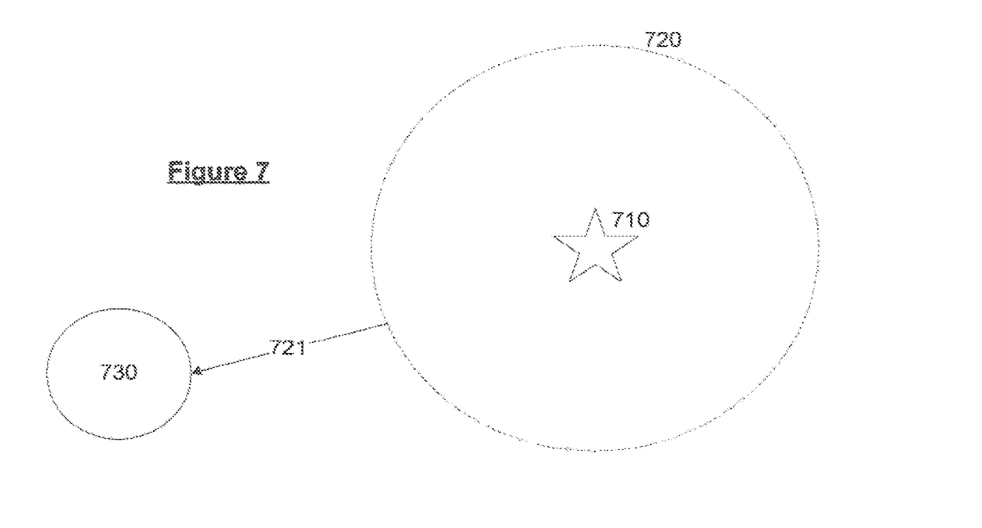
FIG. 7 illustrates the distribution of dynamic data according to an embodiment of the invention.

The use of "hot objects" will be explained with reference to FIG. 7. In FIG. 7 the location of the device 200 is indicated at 710. An object present in the map data at a location is indicated as 730. For example, the object 730 may be a traffic light. Via the method 500 described with reference to FIG. 5 the device 200 may already have been provided with static data 110 for the object, i.e. when the device's location 710 entered a tile containing the object 730. A dynamic updating region 720 is defined around the device's location 710. The region 720 may correspond to a predetermined radius around the location 710, such as 500 m. It will be realised that, in order to reduce the amount of objects for which the device 200 receives dynamic data 130, the radius may be chosen so as not to encompass objects for which dynamic data is not yet required, i.e. the objects are a sufficient distance from the location 710. As the location 710 moves 721, once the radius overlaps, at least partly, the object 730 the dynamic data retrieval module 221 of the device 200 retrieves dynamic data 130 for the object 730 based upon the validity information therein. For example, the module 221 may retrieve or subscribe to the dynamic data 130 for the object based upon the time-to-refresh 144 field of the data 130. The server 250 may send updated dynamic data to the device 200 at the time-to-refresh 144 period until the radius 720 ceases to overlaps the object 730. In this way, the device 200 is provided with dynamic data in proximity to the object 730.

Although FIG. 6 is shown to end after step 650, it will be realised that, in fact, the method of FIG. 6 may be continually performed, particularly steps 630-650 to continue to keep devices updated with dynamic information received from data sources 201-205.

Exemplary Use Cases
Traffic Light—Green Waves

The aim of green wave systems is to enhance traffic flow, user driving experience, fuel efficiency, etc by advising them of an optimum speed of travel such that a vehicle will always reach a traffic light when it is green. This requires an accurate knowledge of the location and current status of traffic lights in the vicinity of the vehicle.

In such systems, all traffic lights are preferably connected to a (back office) server 250, and directly provide timing information and current status to the system. The server 250 collects all the data and converts it into a format such that it can be fed, as a constant stream, to the LBDO loader 262 system.

The static data 110 preferably contains a description of the crossing topology and the section of the road network around the traffic light. The dynamic data 130 preferably contains the current traffic light status and the timing information, such as the duration for which the light will remain its current colour.

Once the data 110, 130 is in the LBDO loader 262 system, the OpenLR location reference is used to determine the tiles in which the traffic lights are location. Due to the relatively high frequency of traffic lights, a tile size of 10 square kilometers may be chosen, although other sizes may be selected as appropriate.

On the client side the serviced widget or client 230 is bound to the local LBDO service 255. Every 500 ms, for example, the widget 230 feeds the current location into the service 255. The current tile is calculated and all the static data 110 for the traffic lights in this tile is synchronized. The system requests the dynamic information 130 only if the location is on a hot stretch or object, as described with reference to FIG. 6, and only if there is an update available the data is collected. Typically this all done in a few hundred milliseconds and because there is only data communicated when absolutely needed the bandwidth footprint is very low.

Weather

Although weather is highly changeable, the changes have relatively low frequency and are associated with large geographical areas. Accordingly, in such a service, the system can have large tiles and only use the static data part to synchronize the weather to the device.

The weather back office or data source 201 feed contains the latest weather information, e.g. rain, hard wind, thunderstorms, which is preferably described by a polygon i.e. defining an area to which that weather applies, and which is typically obtained from third party sources.

The timeout of the static data 110 is set to a few minutes. The dynamic part of the LBDO object data is not needed, as everything is solved in the static part with a relatively fast timeout, for static data.

On the client side 200, the LBDO service is fed with a location, e.g. GPS, update every few minutes. The static data 110 is synced and the actual weather status is updated.

Charging Stations

Charging stations are locations where electric vehicles can be charged. Typically such stations have associated information, such as the type of charge (static) and the current availability (dynamic).

Due to the high density of charging station in urban areas, typically small tiles are needed, e.g. 2 square kilometers. The dynamic data, however, has a low frequency update, and so it is possible to use a relatively slow update and a large timeout.

The navigation engine or a dedicated service can bind to this feed and inject the charging stations directly into the navigation system. The charging stations can therefore be handled as a normal POI with associated dynamic information.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A method of distributing data from a server, said server having memory storing static data and dynamic data associated with one or more objects within a plurality of tiles, each tile defining a geographic area in digital map data, the method comprising:
    selecting, by the server, one or more tiles based on the location of a mobile device;
    synchronising static data on the mobile device with the static data stored in the memory of the server for one or more objects within the selected one or more tiles, wherein the synchronising comprises determining a validity of static data on the mobile device associated with the objects within the tile based upon validity information of the static data, and updating invalid static data on the mobile device; and
    distributing dynamic data updates associated with at least one object to the mobile device based in part on a dynamic updating region surrounding the location of the mobile device, the distributing comprising:
        using validity information of the dynamic data to determine dynamic data to be distributed to the mobile device, and
        determining channels from among a set of channels for which the mobile device is recorded as having registered, each channel in the set of channels including only objects that are associated with a corresponding separate problem space for that channel, and distributing only dynamic data updates associated with objects included in those channels,
    wherein the static data comprises data indicative of one or more slowly-varying attributes associated with the one or more objects and the dynamic data comprises data indicative of dynamically variable attributes associated with the one or more objects, such that the static data varies at a slower rate than the dynamic data.

2. The method of claim 1, wherein the one or more selected tiles comprise at least one of: the tile including the location of the mobile device; and one or more tiles adjoining the tile including the location of the mobile device.

3. The method of claim 1, wherein the validity of the static data is determined based upon the validity information of the static data and a current time.

4. The method of claim 1, wherein the validity information of the static data is at least 3 minutes.

5. The method of claim 1, comprising determining one or more channels for which the mobile device is registered, and wherein only the static data associated with the registered channels is synchronised.

6. The method of any preceding claim 1, comprising the mobile device requesting from the server current dynamic data for one or more objects.

7. The method of claim 1, wherein the dynamic data updates distributed to the mobile device are associated with one or more objects within a predetermined distance of the location of the mobile device.

8. The method of claim 1, wherein the dynamic data updates distributed to the mobile device are associated with one or more objects within the tile encompassing the current location of the mobile device.

9. The method of claim 1, wherein the validity information of the dynamic data indicates a time-to-refresh (TTR) of the dynamic data and the dynamic data is distributed to the mobile device in accordance with the TTR.

10. The method of claim 9, wherein the TTR is less than one second.

11. The method of claim 1, wherein the validity information of the dynamic data is indicative of an expiry time of the dynamic data.

12. A non-transitory computer readable medium comprising computer readable instructions that, when executed on a computer, cause the computer to perform a method according to claim 1.

13. A server, comprising:
    at least one memory device for storing static data and dynamic data associated with one or more objects within a plurality of tiles, each tile defining a geographic area in digital map data;
    a communications device arranged to communicate with a plurality of mobile devices;
    a processor for executing one or more software modules; and
    a location based dynamic object (LBDO) module arranged to:
        select one or more tiles based on the location of a mobile device;
        synchronise static data on the mobile device with the static data stored in the at least one memory device for one or more objects within the selected one or more tiles, wherein the synchronising comprises determining a validity of static data on the mobile device associated with the objects within the tile based upon validity information of the static data, and updating invalid static data on the mobile device; and
        distributing dynamic data updates associated with at least one object to the mobile device based in part on a dynamic updating region surrounding the location of the mobile device, the distributing comprising:

using validity information of the dynamic data to determine dynamic data to be distributed to the mobile device, and determining channels from among a set of channels for which the mobile device is recorded as having registered, each channel in the set of channels including only objects that are associated with a corresponding separate problem space for that channel, and distributing only dynamic data updates associated with objects included in those channels, wherein the static data comprises data indicative of one or more slowly-varying attributes associated with the one or more objects and the dynamic data comprises data indicative of dynamically variable attributes associated with the one or more objects, such that the static data varies at a slower rate than the dynamic data.

14. A mobile device, comprising:

at least one memory device for storing static data and dynamic data associated with one or more objects within a plurality of tiles, each tile defining a geographic area in digital map data;

a communications device arranged to communicate with a remote server; a processor for executing one or more software modules; and a location based dynamic object (LBDO) module arranged to:

synchronise static data stored in the at least one memory device with static data on the remote server based on a location of the mobile device, wherein the static data is associated with one or more objects within at least one tile; and receive dynamic data updates associated with at least one object based upon a dynamic updating region surrounding the location of the mobile device, wherein the static data comprises data indicative of one or more slowly-varying attributes associated with the one or more objects and the dynamic data comprises data indicative of dynamically variable attributes associated with the one or more objects, such that the static data varies at a slower rate than the dynamic data, and wherein the receiving comprises receiving only dynamic data updates associated with objects included in channels from among a set of channels for which the mobile device is recorded as having registered, each channel in the set of channels including only objects that are associated with a corresponding separate problem space for that channel.

* * * * *